United States Patent [19]

Ching Shih

[11] Patent Number: 4,776,360
[45] Date of Patent: Oct. 11, 1988

[54] AUTOMATIC LENSES RINSE MACHINE

[76] Inventor: Cheng Ching Shih, 4F, No. 24, 249 Lane, Tsun-Hsien St., Pei-tou district, Taipei, Taiwan

[21] Appl. No.: 878,807

[22] Filed: Jun. 26, 1986

[51] Int. Cl.⁴ .............................................. B08B 3/04
[52] U.S. Cl. ........................................ 134/140; 74/70; 74/319; 134/158; 134/162; 206/5.1
[58] Field of Search ............... 134/140, 143, 158, 162, 134/157; 206/5.1; 366/243, 251, 278; 422/300, 301; 74/70, 318, 319, 322

[56] References Cited

U.S. PATENT DOCUMENTS

| | | | |
|---|---|---|---|
| 2,040,933 | 5/1936 | Gillen | 74/319 |
| 3,323,320 | 6/1967 | Conz | 336/251 X |
| 3,623,492 | 11/1971 | Frantz et al. | 206/5.1 |
| 3,997,049 | 12/1976 | Sherman | 206/5.1 |

Primary Examiner—Philip R. Coe
Attorney, Agent, or Firm—Allan R. Fowler

[57] ABSTRACT

An automatic contact lens cleaner, generally shaped in an inverted U, comprises a battery holder, an electric motor, a speed reduction gear, an intermittent reversing gear using levers which engage a boss on the drive gear, and a pair of contact lens holders suspended from the reversing gear into a dish containing cleaning fluid. The bottom of the dish (one end of the U) is level with the bottom of the motor/battery-holder housing (the other end of the U), allowing the cleaner to rest upon any convenient supporting surface.

7 Claims, 3 Drawing Sheets

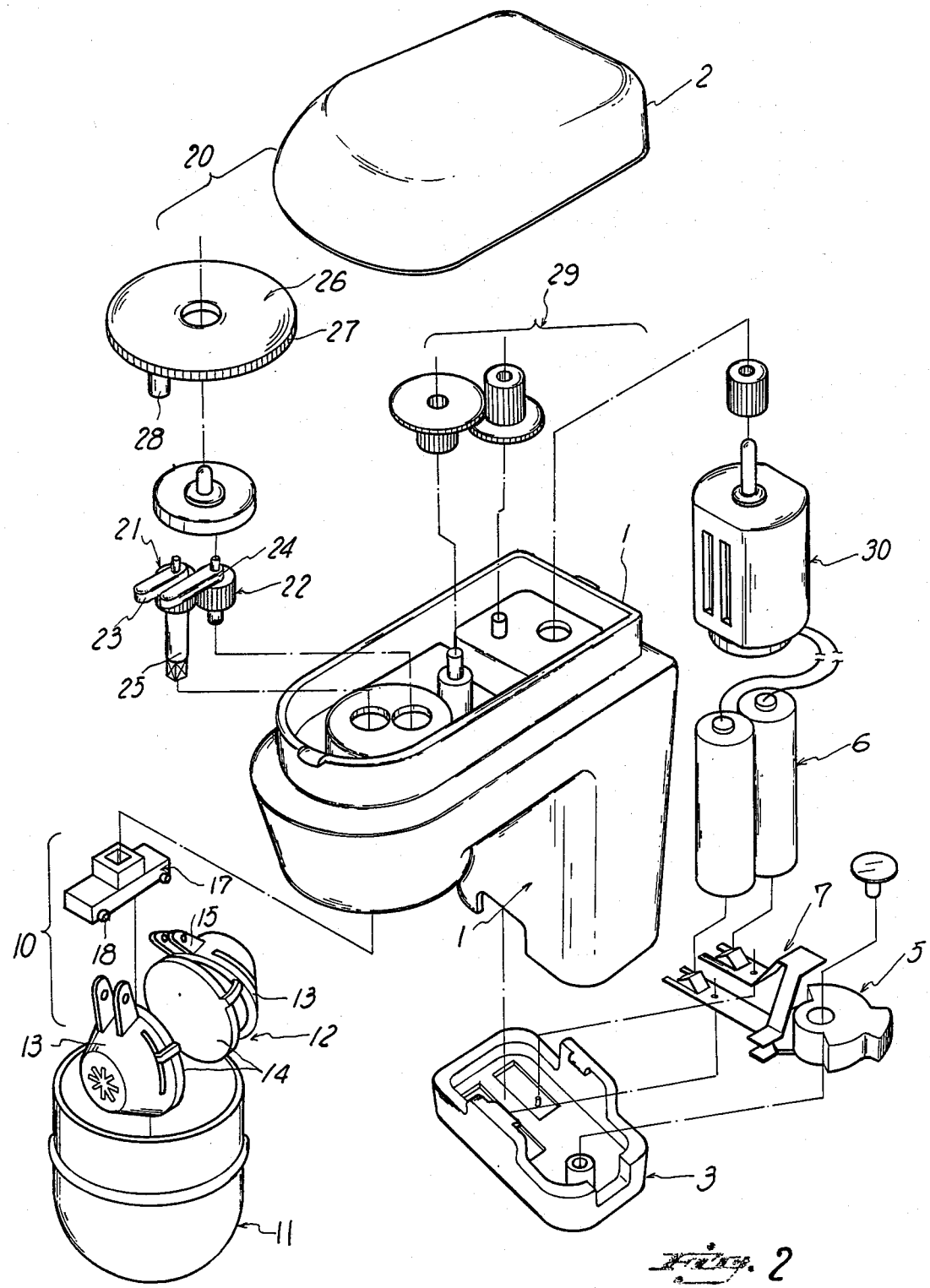

(SECTION A-A)

AUTOMATIC LENSES RINSE MACHINE

This invention relates to contact lens cleaning machines, and more specifically has reference to contact lens cleaning machines which automatically agitate the lenses in a cleaning fluid.

An object of the invention is to provide a contact lens cleaning machine which agitates the lenses by rotating the lens containers in a bath of lens cleaning fluid, intermittently reversing the direction of rotation.

Another object of the invention is to accomplish this intermittent reversing rotation by two lever gears.

Other objects of the invention will be apparent from the following specification taken in conjunction with the accompanying drawings, wherein:

FIG. 2 is an exploded view of the machine;

Figure 3A:
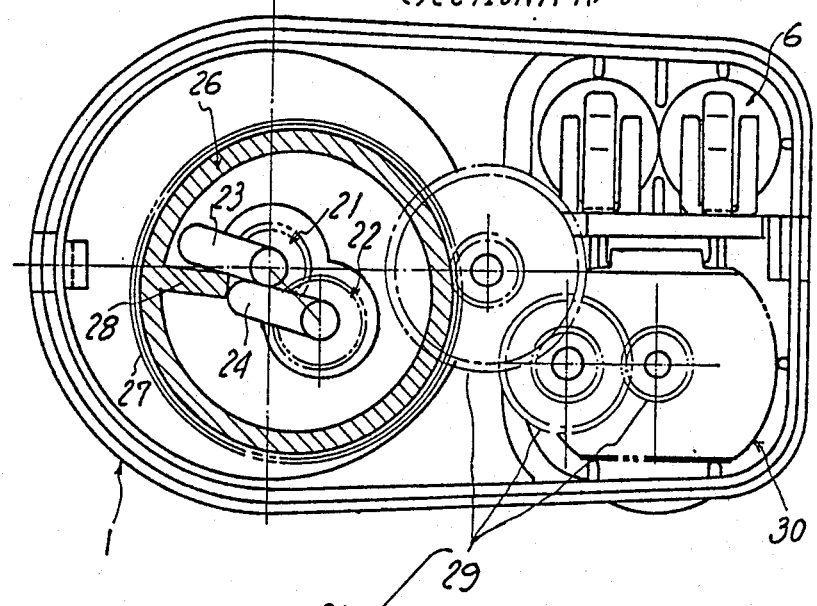
Figure 3B:
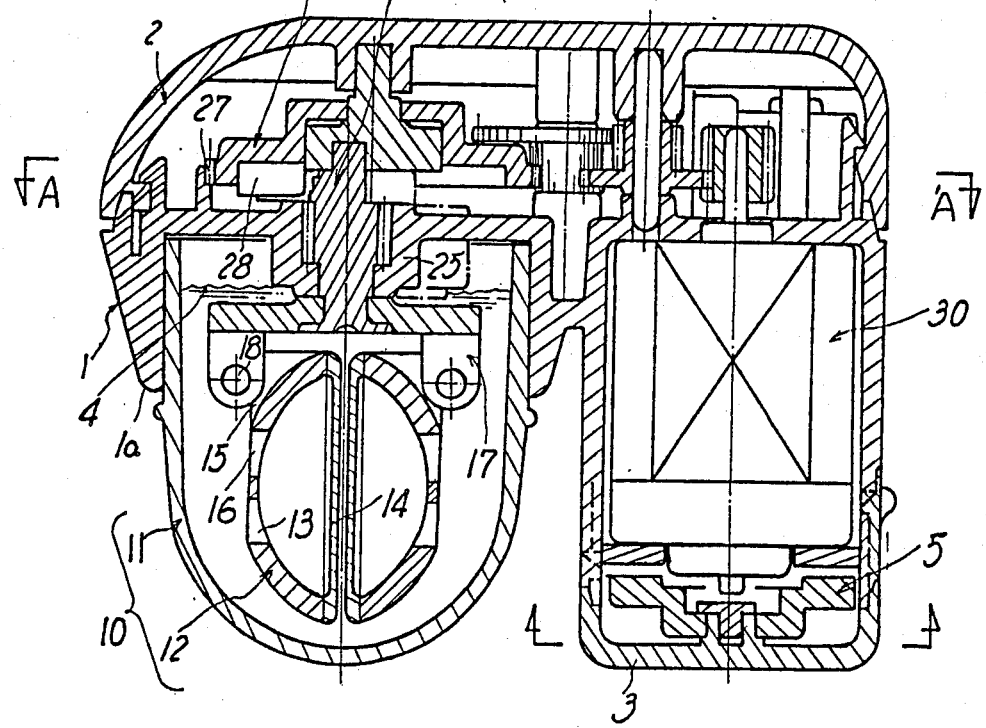

FIG. 3 comprises two cross sections of the machine,

FIG. 3B being a vertical central longitudinal cross section of the machine; and

FIG. 3A being a horizontal cross section of the machine, taken through the section cut line A—A' shown in FIG. 3B; and FIGS. 4A through 4F are schematic representations of the drive, driven, and reverse gears at 60° increments in the rotation of the drive gear.

Figure 1:
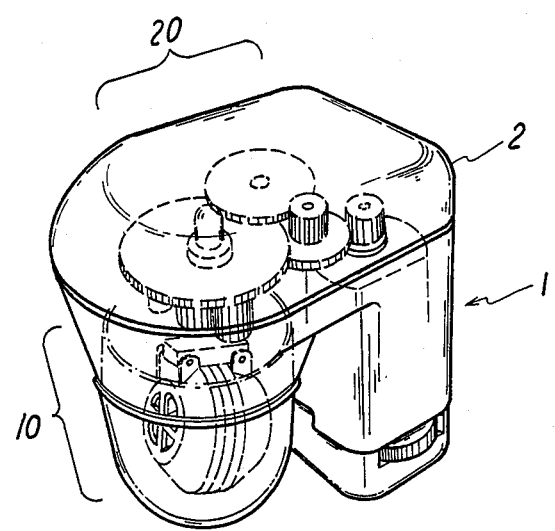
FIG. 1 is a perspective view of the machine, partly in phantom line, showing the main components of the machine.

Turning to FIG. 1, the machine comprises a housing 1, a lid 2, a gear train 20, and a cleansing assembly 10.

The housing 1 comprises a rear vertical portion and an upper horizontal portion. The housing 1 is open on its upper surface. This upper surface is covered by a snap-on, removable lid 2. Immediately beneath the lid 2 is a gear train 20. The front portion of the gear train 20 lies above, and drives, a cleansing assembly 10. The front part of the upper portion of the housing 1 is rounded into a vertical semi-cylinder, slightly larger in cross section than that of the cleansing assembly.

Turning now to FIG. 2, the rear portion of the housing 1 has a rectangular horizontal cross section and is open on its bottom surface. This bottom surface is covered by a rectangular snap-on removable battery retainer 3. A pair of battery contacts 7 lie in the battery retainer 3, and exert a spring bias against the lower ends of a corresponding pair of vertically oriented batteries 6. A switch 5 is rotatably mounted on the battery retainer 3. The contacts 7 are spring biased towards each other on opposite sides of the switch 5. Rotating the switch 5 allows the contacts 7 to make or break an electrical connection with each other.

The batteries 6 are contained in a battery holder in the rear portion of the housing 1. An electric motor 30 is also contained in the rear portion of the housing 1, with its rotor protruding vertically from its top. The motor 30 is electrically connected to the upper ends of the batteries 6. Closing the switch 5 allows current to flow between the batteries 6, and, thus, through the motor 30. The motor 30 drives one end of the gear train 20. The other end of the gear train 20 drives the cleansing assembly 10.

The cleansing assembly 10 comprises a fluid dish 11, a pair of lens containers 12, and a hanging support 17.

The fluid dish 11 is generally in the form of a cylinder which is open on the top and is closed on the bottom by a downwardly convex hemisphere. The interior of the fluid dish 11 contains a cleansing fluid 4. The top of the fluid dish 11 is press fitted into a mating opening in the underside of the upper portion of the housing 1, and is removably press retained therein by a lip 1a (FIG. 3B). The press retention is sufficiently tight to prevent fluid 4 from leaking between the lip 1a and the fluid dish 11. The axis of the fluid dish 11 is vertical and lies in the central longitudinal plane of the machine. The bottom surfaces of the dish 11 and of the rear portion of the housing 1 lie in a horizontal plane. This allows the machine to rest upon any convenient supporting surface.

Right and left contact lens containers 12 are suspended in the fluid 4. Each lens container 12 comprises a lens dish 13 and a lens cover 14. Each lens dish 13 is approximately hemispherical, and is suspended back-to-back with the other lens dish 13; that is, they together form an approximate sphere. Each lens cover 14 is snap-open mounted onto its associated lens dish 13, and rotates on the lens dish 13 by an integral hinge at the top thereof. A slot extending through each lens dish 13 engages the snap of the associated lens cover 14, and simultaneously allows fluid 4 to enter and exit the space between the lens dish 13 and lens cover 14 and to bathe the contact lens contained therein. Additional openings in the lens dish 13 are provided to allow additional fluid 4 to enter and exit.

Each lens dish 13 hangs by a hinge 15 from a pair of protuberances 18 on a support 17. The support 17 is press fitted onto a squared shaft 25, which protrudes vertically downwards from the front end of the gear train 20.

The gear train 20 comprises a speed reduction gear apparatus 29 and a reversing gear apparatus. All gears have externally toothed wheels and fixed vertical axes.

The speed reduction gear apparatus 29 comprises three speed reduction gears. The first speed reduction gear includes a single, small radius wheel. It is mounted directly onto the rotor of the motor 30. The second speed reduction gear has lower, large radius wheel, which engages the first speed reduction gear. It also has an upper, small radius wheel, which engages the third speed reduction gear. The third speed reduction gear has an upper, large radius wheel, which engages the second speed reduction wheel. It also has a lower, small radius wheel which engages the teeth 27 of a drive wheel 26 of the reversing gear apparatus.

The reversing gear apparatus' drive, or outer, wheel 26 has a large radius, further reducing the speed of rotation. A boss 28 protrudes downward from its periphery. It alternately engages two inner gears, a driven gear and reverse gear. The driven gear comprises a small radius driven wheel 21 and a horizontal driven lever 23 above it with a length somewhat larger than the radius of the wheel 21. The reverse gear, comprising reverse wheel 22 and reverse lever 24, is identical to the driven gear except for its position.

Turning now to FIGS. 2 and 3A, the driven wheel 21 is located on the vertical longitudinal center plane of the machine, above the center of the fluid dish 11. Shaft 25 protrudes vertically downward from its center for a sufficient distance to submerge the lenses into the fluid 4. The reverse wheel 22 engages the driven wheel 21. Its axis is out of the vertical longitudinal center plane of the machine and is closer to the speed reduction gear apparatus 29 than is the axis of the driven wheel 21. The axis of the drive wheel 26 passes through the point of engagement of the driven wheel 21 and reverse wheel 22.

Figure 4A:
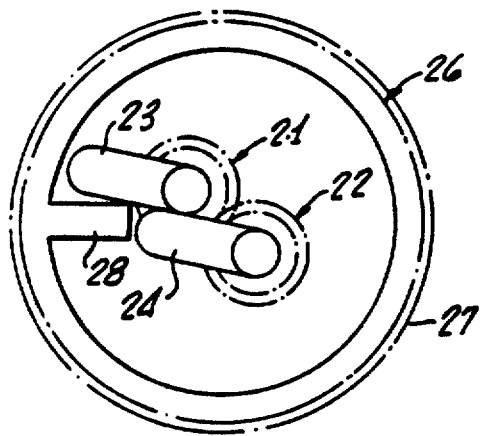
Figure 4B:
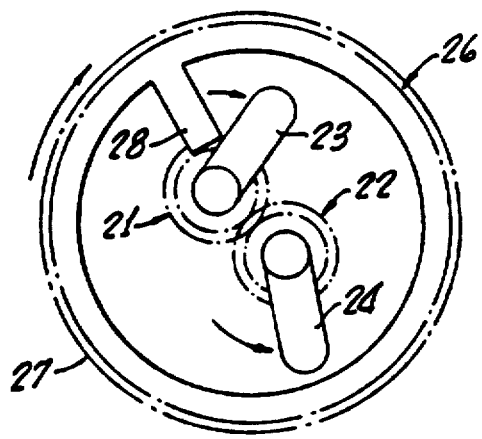
Figure 4C:
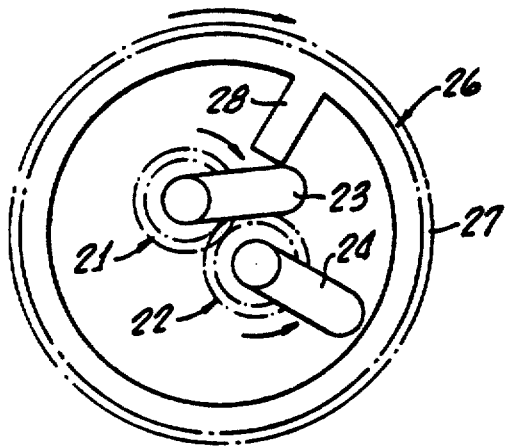
Figure 4D:
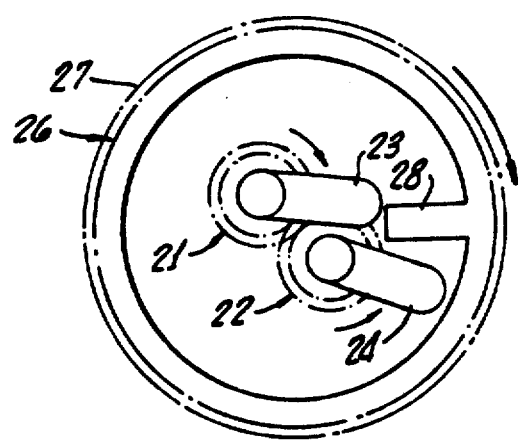
Figure 4E:
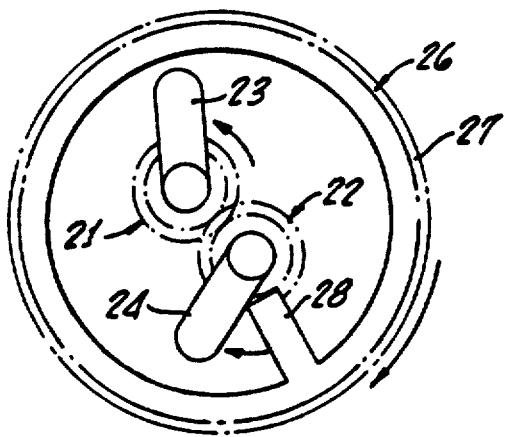
Figure 4F:
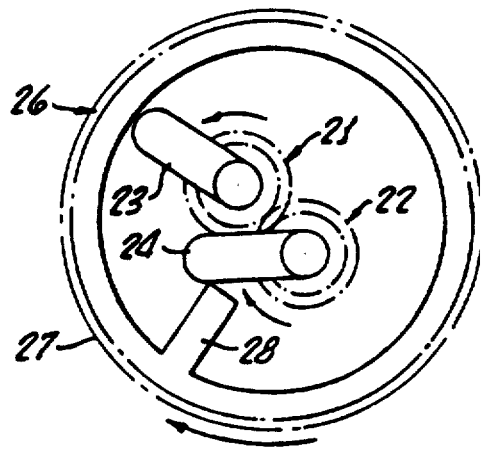

Turning now to FIGS. 4A through 4F, it is seen that, during the first half of the cycle (FIGS. 4A through 4D), the drive wheel's boss 28 engages the driven lever 23, without engaging the reverse lever 24. This causes the driven wheel 21, which engages the reverse wheel 22, to rotate the reverse wheel 22 in the reverse direction. In turn, this causes the reverse lever 24 to rotate into a position to engage the drive wheel's boss 28 at the end of the first half of the cycle (FIG. 4D).

During the second half of the cycle (FIGS. 4D through 4A), the drive wheel's boss 28 disengages the driven lever 23, and engages the reverse lever 24. This causes the reverse wheel 22, which engages the driven wheel 21, to rotate the driven wheel 21 in the reverse direction. In turn, this causes the driven lever 23 to rotate back into a position to engage the drive wheel's boss 28 at the end of the cycle, and thence to begin a new cycle.

In order for the boss 28 to engage and disengage the levers 23, 24, each lever 23, 24, has a length which is greater than the difference between:
 (a) the radius of the drive wheel's boss 28 and
 (b) the distance between its axis and the axis of the drive wheel 26.
Likewise, this length is less than the sum of:
 (a) the radius of the drive wheel's boss 28 and
 (b) the distance between its axis and the axis of the drive wheel 26.

In addition, the length of the levers 23, 24 is greater than the radius of the wheels 21, 22. This allows the boss 28 to be long enough to fully engage the levers 23, 24—indeed, to protrude below them when desired—without engaging the wheels 21, 22.

What is claimed is:

1. An automatic machine for cleaning contact lenses, the machine being generally in the form of an inverted U, and comprising:
 (a) a housing having an upper, horizontal portion, and a rear, vertical portion, the upper and rear portions intersecting, and the rear portion of the housing having a bottom surface;
 (b) a battery holder in the rear portion of the housing;
 (c) an electric motor, in the rear portion of the housing, electrically connected to the battery holder, the rotor of said motor protruding into the intersection of the upper and rear portions of the housing and having a vertical axis;
 (d) an intermittently reversing gear train in the upper portion of the housing having a rear end and a front end, the rear end of the train lying in a rear part of the upper portion of the housing, above and attached to the rotor, and the front end of the train lying in a front part of the upper portion of the housing;
 (e) a cleaning fluid dish, removably suspended below the front end of the train and having a bottom surface, a portion of the bottom surface of the dish and the botoom surface of the rear portion of the housing lying in a horizontal plane; and
 (f) at least one contact lens holder suspended within the dish by a shaft attached to the front end of the train.

2. The machine of claim 1, wherein the dish includes a rim and seals to the housing.

3. The machine of claim 1, further comprising a switch electrically connected between the battery holder and the motor.

4. An automatic machine for cleaning contact lenses comprising:
 (a) a housing;
 (b) a battery holder in the housing;
 (c) an electric motor in the battery housing, electrically connected to the battery housing;
 (d) an intermittently reversing gear train including a pair of lever gears and having a rear end and a front end, the rear end of the train being attached to the rotor of said motor;
 (e) a cleaning fluid dish, removably suspended below the front end of the train; and
 (f) at least one contact lens holder suspended within the dish by a shaft attached to the front end of the train.

5. The machine of claim 4, wherein:
 (a) the gear train comprises a drive gear wheel, a driven gear wheel, and a reverse gear wheel;
 (b) the wheels have parallel axes;
 (c) the drive gear wheel has a boss protruding from it; and
 (d) each of the driven and reverse gear wheels:
  (1) is externally toothed;
  (2) has a lever protruding from its axis out of the plane of its teeth for a distance from its axis which is:
   (A) greater than the difference between
    (1) the radius of the drive wheel's boss and
    (2) the distance between its axis and the drive wheel's axis, and
   (B) less than the sum of
    (1) the radius of the drive wheel's boss and
    (2) the distance between its axis and the drive wheel's axis; and
  (3) engages its teeth to the teeth of the other wheel; and
 (e) the axis of the drive wheel passes through the point of engagement of the driven wheel and the reverse wheel.

6. The machine of claim 5, wherein each of the driven and reverse gear's levers protrudes from its axis for a distance greater than the radius of the teeth of that gear.

7. An automatic machine for cleaning contact lenses, the machine being generally in the form of an inverted U, and comprising:
 (a) a housing having an upper, horizontal portion, and a rear, vertical portion, the upper and rear portions intersecting, and the rear portion of the housing having a bottom surface;
 (b) a battery holder in the rear portion of the housing;
 (c) an electric motor, in the rear portion of the housing, electrically connected to the battery holder, the rotor of said motor protruding into the intersection of the upper and rear portions of the housing and having a vertical axis;
 (d) an intermittently reversing gear train, including a speed reduction gear and a pair of lever gears, in the upper portion of the housing, and having a rear end and a front end, the rear end of the train lying in a rear part of the upper portion of the housing, above and attached to the rotor, and the front end of the train lying in a front part of the upper portion of the housing; the train comprising:
  (1) a drive gear wheel with a boss protruding from it; and
  (2) a driven and a reverse gear wheel, each of which:
   (A) is externally toothed;

(B) has a lever protruding from its axis out of the plane of the teeth for a distance from the axis which is:
  (1) greater than the difference between
    (a) the radius of the drive wheel's boss and
    (b) the distance between its axis and the drive wheel's axis,
  (2) less than the sum of
    (a) the radius of the drive wheel's boss and
    (b) the distance between its axis and the drive wheel's axis, and
  (3) greater than the radius of the teeth of that gear; and
(C) engages its teeth to the teeth of the other wheel;
whereby:
(D) during the first half of the cycle:
  (1) the drive wheel's boss engages the driven wheel's lever, without engaging the reverse wheel's lever,
  (2) thereby causing the driven wheel's teeth, which engage the reverse wheel's teeth, to rotate the reverse wheel in the reverse direction,
  (3) thereby further causing the reverse wheel's lever to rotate into a position to engage the drive wheel's boss at the end of the first half of the cycle; and
(E) during the second half of the cycle:
  (1) the drive wheel's boss disengages the driven wheel's lever, and engages the reverse wheel's lever,
  (2) thereby causing the reverse wheel's teeth, which engage the driven wheel's teeth, to rotate the driven wheel in the reverse direction,
  (3) thereby further causing the reverse wheel's lever to rotate into a position to engage the drive wheel's boss at the end of the first half of the cycle;
(e) the axis of the drive wheel passes through the point of engagement of the driven wheel and the reverse wheel;
(f) a cleaning fluid dish, including a rim and sealing to the housing, removably suspended below the front end of the train and having a bottom surface, a portion of the bottom surface of the dish and the bottom surface of the rear portion of the housing lying in a horizontal plane;
(g) at least one contact lens holder suspended within the dish by a shaft attached to the front end of the train; and
(h) a switch electrically connected to the front end of the train.

* * * * *

UNITED STATES PATENT AND TRADEMARK OFFICE
CERTIFICATE OF CORRECTION

PATENT NO. : 4,776,360
DATED : October 11, 1988
INVENTOR(S) : Ching-Shih Chen

It is certified that error appears in the above—identified patent and that said Letters Patent is hereby corrected as shown below:

Title page, paragraph [76]: Cancel "Cheng Ching Shih" and insert --Ching-Shih Chen--.

In the Drawings, Figures 4a-4f should be added as per attached sheets.

Signed and Sealed this

Twenty-sixth Day of December, 1989

Attest:

JEFFREY M. SAMUELS

Attesting Officer        Acting Commissioner of Patents and Trademarks